(12) United States Patent
Kim et al.

(10) Patent No.: US 8,733,326 B2
(45) Date of Patent: May 27, 2014

(54) DUAL FUEL INJECTOR FOR A COMMON RAIL SYSTEM

(75) Inventors: Hoisan Kim, Dunlap, IL (US);
Xiangdong Ding, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 509 days.

(21) Appl. No.: 13/168,372

(22) Filed: Jun. 24, 2011

(65) Prior Publication Data
US 2012/0325350 A1 Dec. 27, 2012

(51) Int. Cl.
*F02M 21/02* (2006.01)
*B05B 7/12* (2006.01)

(52) U.S. Cl.
USPC .......................... 123/525; 123/575; 239/417.5

(58) Field of Classification Search
USPC ............... 123/525, 527, 575–578; 239/417.5, 239/585.1–585.5
See application file for complete search history.

(56) References Cited

U.S. PATENT DOCUMENTS

| | | |
|---|---|---|
| 5,199,398 A | 4/1993 | Nylund |
| 5,458,292 A | 10/1995 | Hapeman |
| 6,298,833 B1 * | 10/2001 | Douville et al. ............... 123/527 |
| 6,336,598 B1 | 1/2002 | Touchette et al. |
| 7,124,959 B2 | 10/2006 | Baker et al. |
| 7,373,931 B2 * | 5/2008 | Lennox et al. ................. 123/525 |
| 7,438,238 B2 * | 10/2008 | Date et al. ......................... 239/96 |
| 8,322,325 B2 * | 12/2012 | Rogak et al. ................... 123/304 |
| 8,459,576 B2 * | 6/2013 | Kim et al. ................... 239/585.1 |
| 8,596,561 B2 * | 12/2013 | Kim et al. ................... 239/585.5 |
| 2006/0081722 A1* | 4/2006 | Kato et al. ....................... 239/96 |

FOREIGN PATENT DOCUMENTS

| | | |
|---|---|---|
| DE | 3012418 | 10/1981 |
| EP | 610584 | 9/1996 |
| EP | 546985 | 3/1999 |
| GB | 2270346 | 3/1994 |
| JP | 59122722 | 7/1984 |
| JP | 61116060 | 6/2011 |

* cited by examiner

*Primary Examiner* — Thomas Moulis
(74) *Attorney, Agent, or Firm* — Carl E. Myers

(57) ABSTRACT

A dual fuel common rail fuel injector includes a first and second control valve assembly and a first and second check needle. The dual fuel injector is capable of selectively injecting two different fuels such as diesel and liquefied natural gas. The first and second control valve assemblies operate using a single fuel, such as diesel, as the control medium. The dual fuel common rail injector further includes a hydraulic lock assembly.

20 Claims, 6 Drawing Sheets

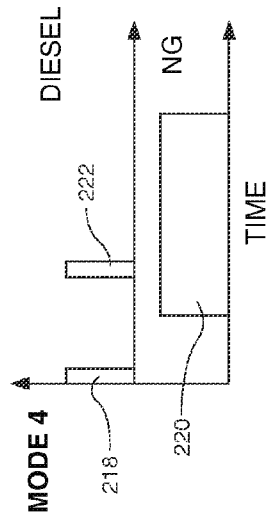
FIG. 6A MODE 1
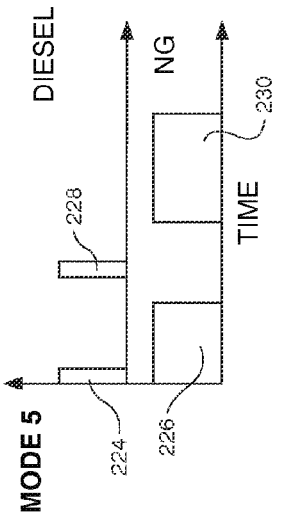
FIG. 6B MODE 2
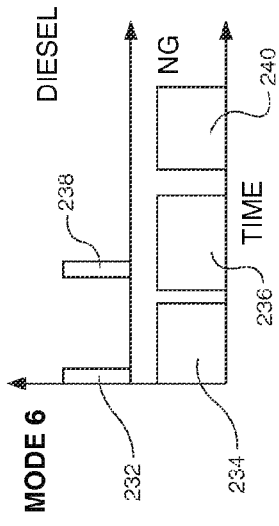
FIG. 6C MODE 3
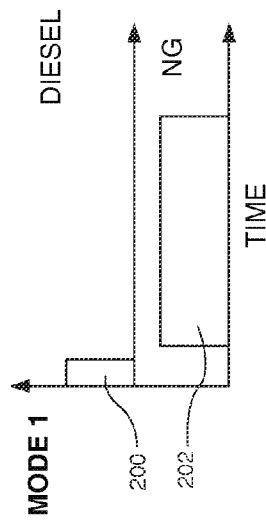
FIG. 6D MODE 4
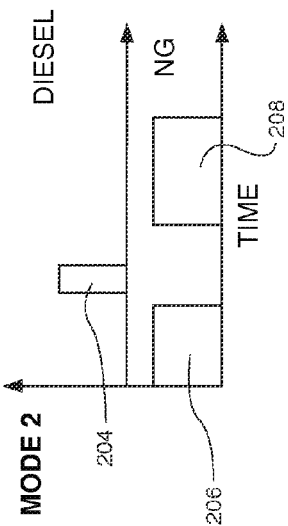
FIG. 6E MODE 5
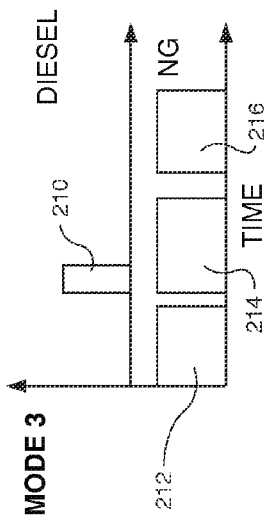
FIG. 6F MODE 6

DUAL FUEL INJECTOR FOR A COMMON RAIL SYSTEM

TECHNICAL FIELD

The present disclosure relates generally to dual fuel common rail systems, and more particularly to a fuel injector configured to receive two separate fluids and selectively inject the fluids independent of one another.

BACKGROUND

Gaseous fuel engines are known for their ability to burn relatively clean relative to their compression ignition engine counterparts. However, gaseous fuels are well known for the difficulty in attaining successful ignition. Some gaseous fuel engines utilize a spark plug, whereas other engines are known for utilizing a small amount of distillate diesel fuel that is compression ignited to in turn ignite a larger charge of gaseous fuel. Fuel systems capable of independently injecting both a gaseous fuel and a diesel fuel in a manner that is both safe and efficient has proven to be elusive. U.S. Pat. No. 4,499,862 issued to Baumer, et al. sought to address this issue. However, this reference fails to teach an injector that can independently receive two fluids, keep those fluids separate, and independently control the injection of the fluids.

The present disclosure is directed toward one or more of the problems set forth above.

SUMMARY OF THE DISCLOSURE

In one aspect, a dual fuel injector including an injector body defining a dual fuel inlet configured to receive a first fuel and a second fuel, a first fuel supply passage, a second fuel supply passage, a first fuel control chamber, a second fuel control chamber, a first fuel control line, a second fuel control line, at least one low pressure drain, a second fuel check cavity, and a nozzle having at least one first fuel outlet and at least one second fuel outlet. Also included is a first fuel check needle disposed in the first fuel check cavity and movable between a first position wherein the first fuel check needle blocks fluid communication between the first fuel supply passage and the at least one first fuel outlet, and a second position wherein the first fuel check needle at least partially allows fluid communication between the first fuel supply passage and the at least one first fuel outlet, and wherein the first fuel check needle defines an interior cavity. Also included is a second fuel check needle positioned within the interior cavity of the first fuel check needle and movable between a first position wherein the second fuel check needle blocks fluid communication between the second fuel supply passage and the at least one second fuel outlet, and a second position wherein the second fuel check needle at least partially allows fluid communication between the second fuel supply passage and the at least one second fuel outlet. The dual fuel injector also includes a hydraulic lock assembly configured to facilitate fluid communication between the first fuel supply passage and gaseous check cavity. Also included is a first fuel control valve assembly disposed at least partially within the injector body and having a control valve member that selectively allow fluid communication between the first fuel control chamber, the first fuel control line and the at least one low pressure drain. The dual fuel injector also includes a second fuel control valve assembly disposed at least partially within the injector body and having a control valve member the selectively allows fluid communication between the second fuel control passage and the at least one low pressure drain.

In another aspect, a dual fuel common rail fuel system including a first fuel source, a second fuel source, a first fuel rail, a second fuel rail, at least one first fuel pump configured pressurize the first fuel from the first fuel source and deliver the first fuel to the first fuel rail, at least one second fuel pump configured to pressurize the second fuel from the second fuel source and deliver the second fuel to the second fuel rail, a quill configured to the first fuel from the first fuel rail and second fuel from the second fuel rail, and a dual fuel injector configured to receive both the first fuel and the second fuel from the quill. The dual fuel injector further includes an injector body defining a dual fuel inlet configured to receive a first fuel and a second fuel, a first fuel supply passage, a second fuel supply passage, a first fuel control chamber, a second fuel control chamber, a first fuel control line, a second fuel control line, at least one low pressure drain, a second fuel check cavity, and a nozzle having at least one first fuel outlet and at least one second fuel outlet. The dual fuel injector also includes a first fuel check needle disposed in the first fuel check cavity and movable between a first position wherein the first fuel check needle blocks fluid communication between the first fuel supply passage and the at least one first fuel outlet, and a second position wherein the first fuel check needle at least partially allows fluid communication between the first fuel supply passage and the at least one first fuel outlet, and wherein the first fuel check needle defines an interior cavity. Also included is a second fuel check needle positioned within the interior cavity of the first fuel check needle and movable between a first position wherein the second fuel check needle blocks fluid communication between the second fuel supply passage and the at least one second fuel outlet, and a second position wherein the second fuel check needle at least partially allows fluid communication between the second fuel supply passage and the at least one second fuel outlet. Also included is a hydraulic lock assembly configured to facilitate fluid communication between the first fuel supply passage and gaseous check cavity. The dual fuel injector also includes a first fuel control valve assembly disposed at least partially within the injector body and having a control valve member that selectively allow fluid communication between the first fuel control chamber, the first fuel control line and the at least one low pressure drain. Also included is a second fuel control valve assembly disposed at least partially within the injector body and having a control valve member the selectively allows fluid communication between the second fuel control passage and the at least one low pressure drain.

BRIEF DESCRIPTION OF THE DRAWINGS

FIGS. 6a-6f are injection volume versus time plots of a variety of exemplary shot modes carried out by the disclosed dual fuel common rail injector.

DETAILED DESCRIPTION

Figure 1:
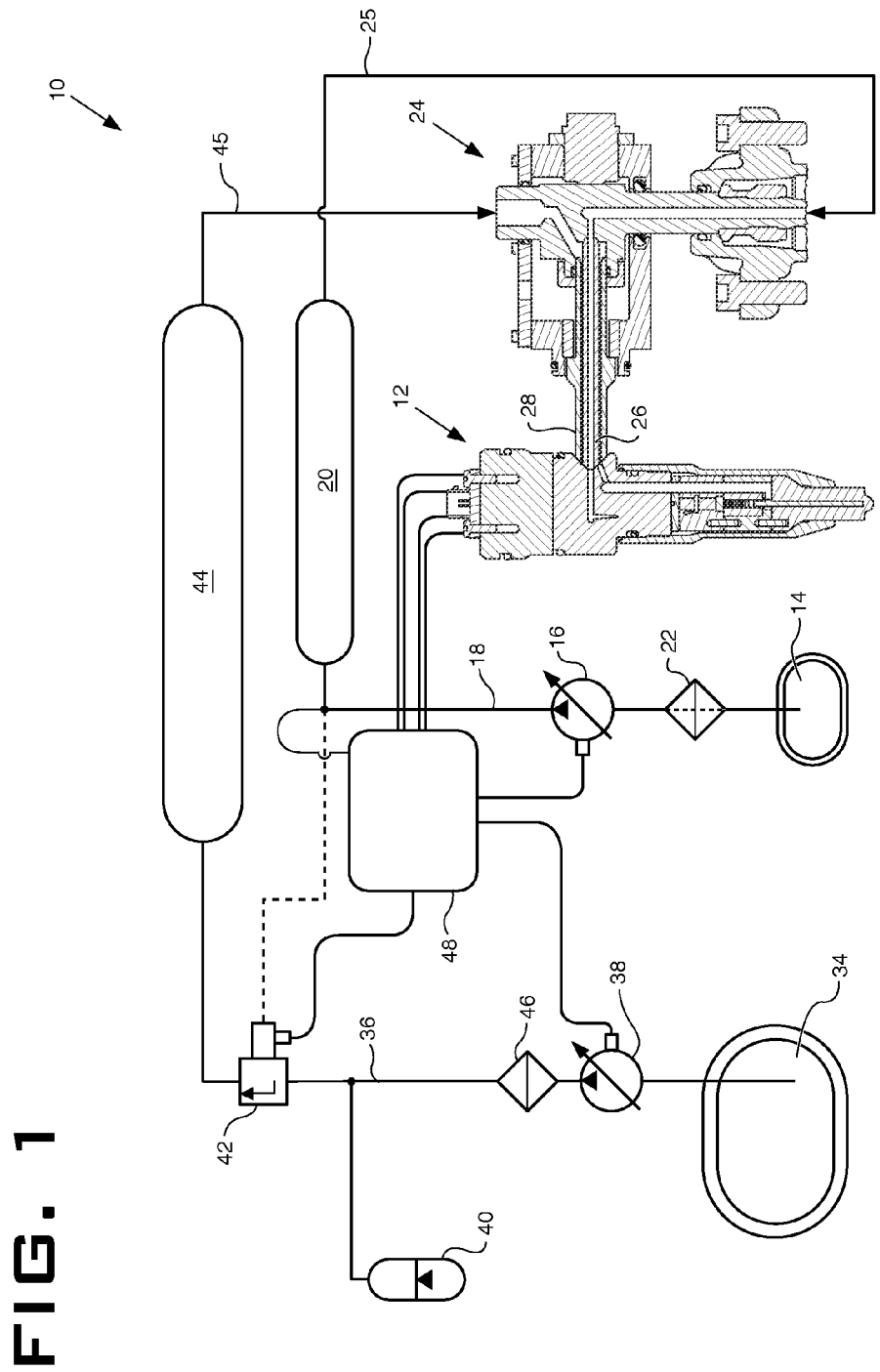
FIG. 1 is a diagrammatic schematic of a fuel system incorporating a dual fuel common rail injector.
Figure 2:
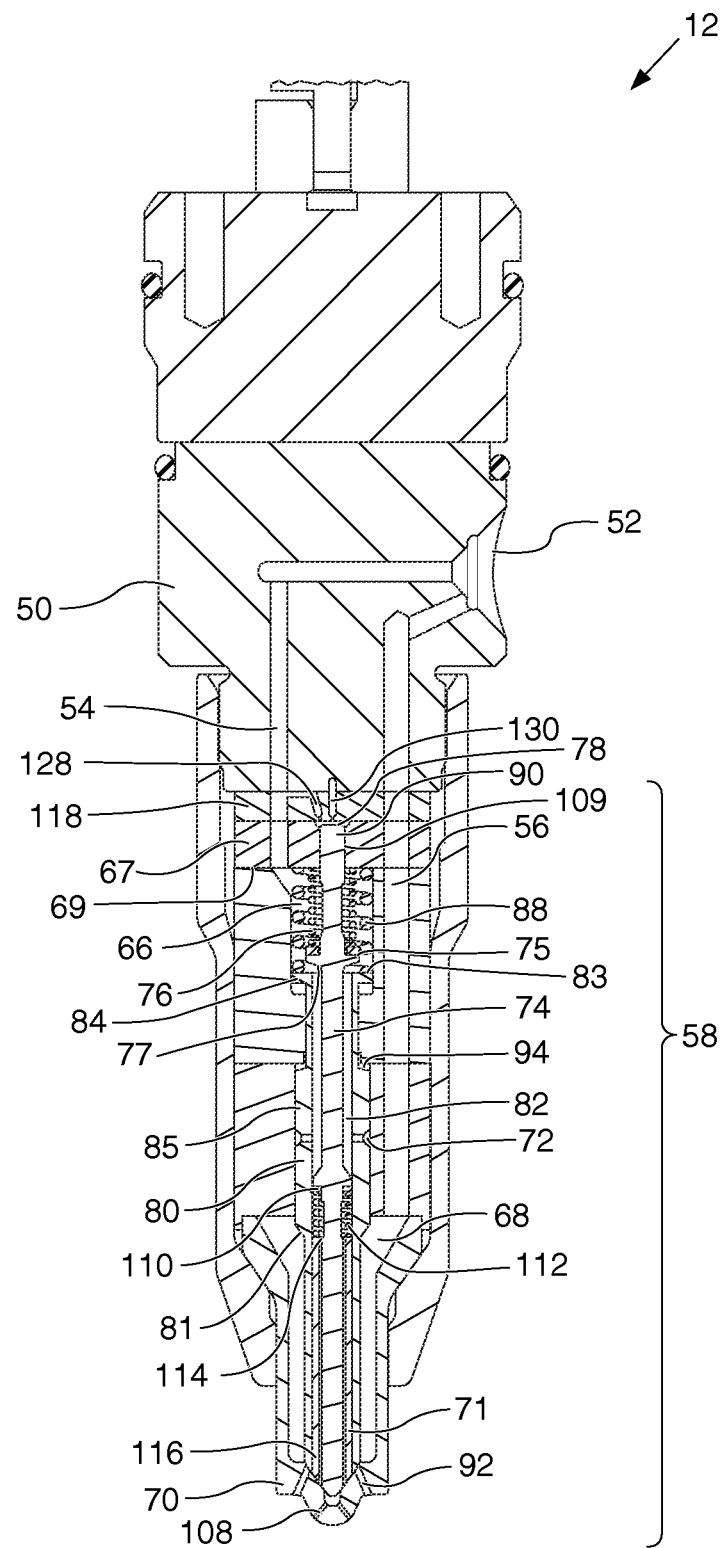
FIG. 2 is a cross section of a dual fuel injector according to a first embodiment.
Figure 3:
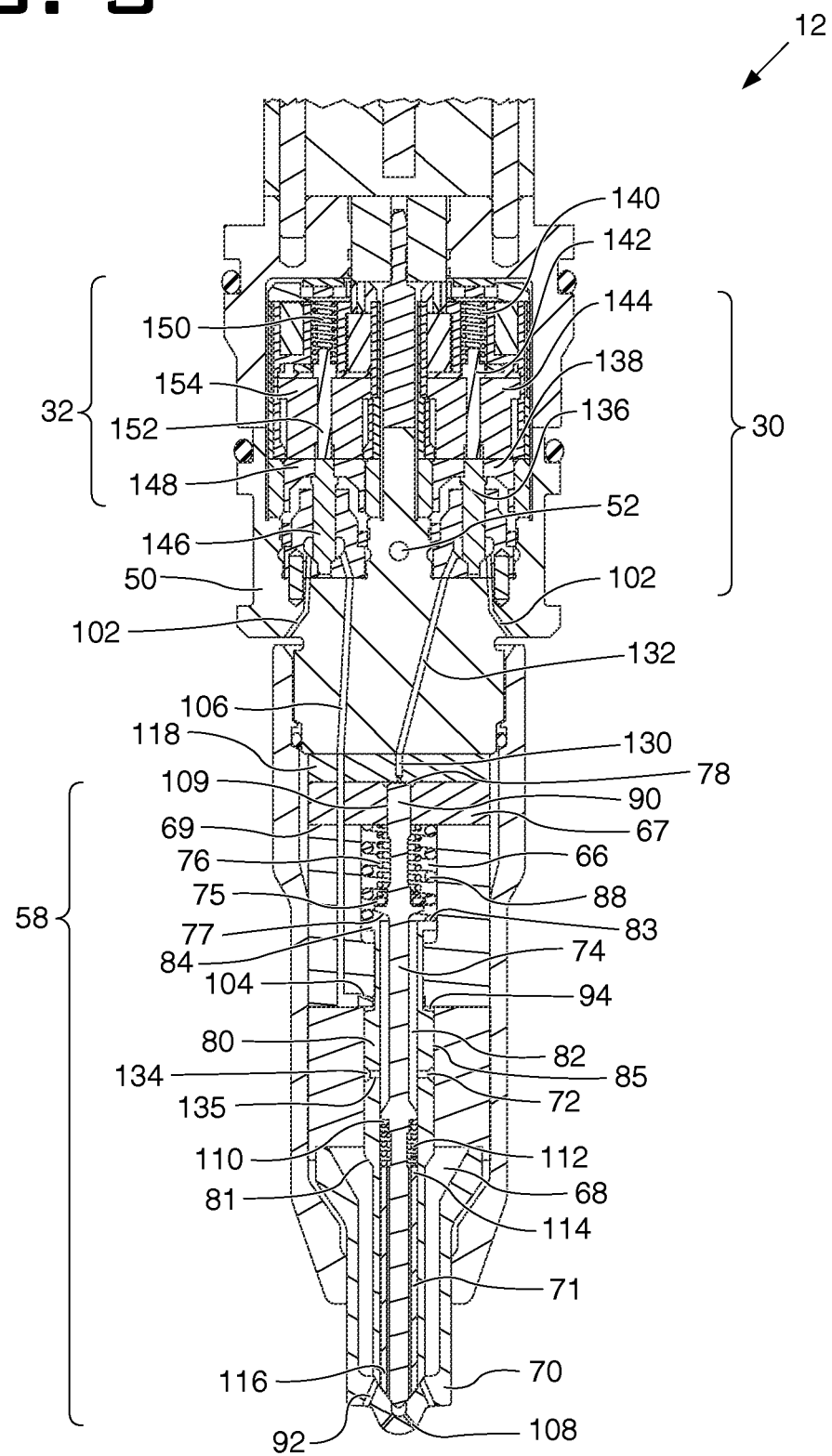
FIG. 3 is a differently oriented cross section of the dual fuel injector according to the first embodiment.

Referring to FIG. 1, a dual fuel common rail fuel system 10 utilizing a dual fuel common rail injector 12 is shown. For ease of discussion, the dual fuel common rail injector will be referred to as "injector 12". A diesel fuel source 14 contains diesel fuel. A diesel pump 16 draws diesel fuel through diesel supply line 18; pressurizes the diesel fuel; and delivers the pressurized diesel fuel to a diesel fuel rail 20. A filter 22 may be disposed in the diesel supply line 18 upstream of the diesel pump 16 and downstream of the diesel fuel source 14. Diesel fuel within the diesel fuel rail 20 may be pressurized to a pressure of approximately 40 MPa. Pressurized diesel fuel from the diesel fuel rail 20 may then be delivered to a quill assembly 24 via diesel fuel line 25. Quill assembly 24 is configured to receive both diesel fuel and a gaseous fuel such as liquefied natural gas. Those skilled in the art will recognize that the gaseous fuel may be any gaseous fuel such as natural gas, propane, methane, liquefied petroleum gas (LPG), synthetic gas, landfill gas, coal gas, biogas from agricultural anaerobic digesters, or any other gaseous fuel. Quill assembly 24 may further be a coaxial type wherein diesel fuel is disposed within a first quill tube 26, which is disposed within a second quill tube 28 also carrying gaseous fuel. Diesel fuel from quill assembly 24 is then delivered to injector 12. As shown in FIGS. 2 and 3, diesel fuel supplied to injector 12 is both injected and also functions as a control medium for the diesel control valve assembly 30 and the gaseous control valve assembly 32 of injector 12.

Dual fuel common rail fuel system 10 further includes a gaseous fuel source 34. Gaseous fuel, such as liquefied natural gas may be stored at relatively low temperatures and pressures (−160° C. and 100 kPa). Because gaseous fuel may be stored under such temperatures and pressures, it may be necessary for the gaseous fuel to be kept in a vacuum insulated tank. Gaseous fuel is drawn from gaseous fuel source 34 through a gaseous supply line 36 by a fuel pump 38. Fuel pump 38 may be a variable displacement cryogenic pump. Fuel pump 38 pressurizes and delivers gaseous fuel to an accumulator 40 via gaseous supply line 36. A filter 46 may filter contaminants within gaseous supply line 36. Gaseous supply line 36 may also include a secondary filter 47. A pressure regulator 42 ensures that gaseous fuel delivered to a gaseous fuel rail 44 is at a pressure that is at least 5 MPa below that of the diesel fuel within the diesel fuel rail 20 via gaseous fuel line 45. For example, within the dual fuel common rail fuel system 10, diesel fuel within the diesel fuel rail 20 may be at a pressure of 40 MPa, while gaseous fuel within the gaseous fuel rail 44 may be at a pressure of 35 MPa.

An electronic control module (ECM) 48 may control various components of dual fuel common rail fuel system 10. For example, the ECM may control the diesel control valve assembly 30 and the gaseous control valve assembly 32 of injector 12. Likewise, the ECM may also control components such as the diesel pump 16, fuel pump 38, and pressure regulator 42. Those skilled in the art will recognize that fuel system may further include other components that can also be controlled by ECM 48.

Turning now to FIGS. 2 and 3, which depict the internal structure and fluid circuitry of injector 12 according to a first embodiment. In particular, an injector body 50 defines a coaxial dual fuel supply inlet 52. Dual fuel supply inlet 52 is configured to receive the concentric first and second quill tubes 26, 28. Injector body 50 further defines a diesel fuel supply passage 54 and a gaseous fuel supply passage 56 both of which fluidly connect to the dual fuel inlet 52. In the embodiment shown, first quill tube 26 delivers diesel to the dual fuel inlet 52 where it fluidly connects to diesel fuel supply passage 54. Similarly, second quill tube 28 delivers gaseous fuel to the dual fuel inlet 52, where it fluidly connects to gaseous fuel supply passage 56.

Figure 4:
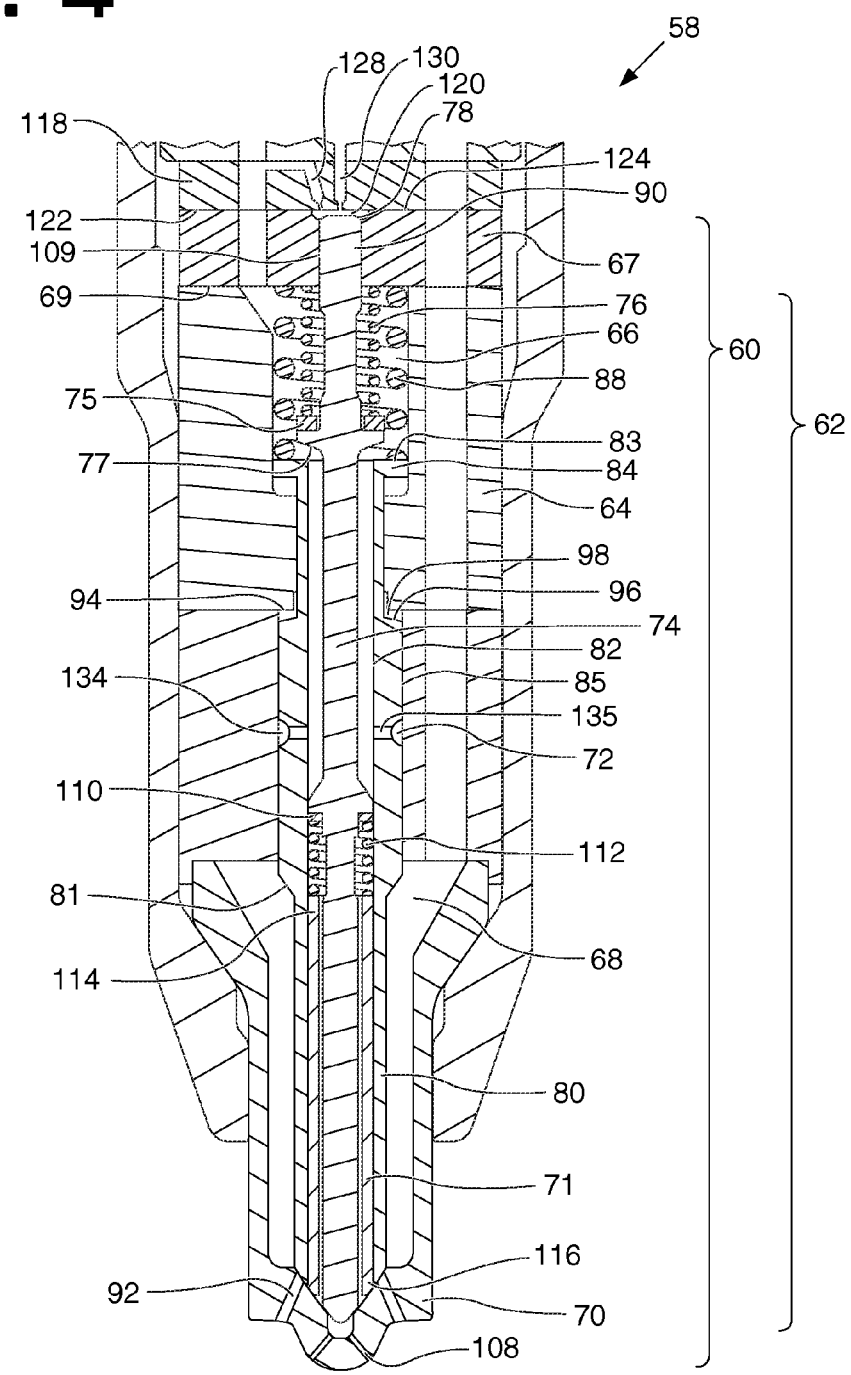
FIG. 4 is a detail of a nozzle group of the dual fuel injector according to the first embodiment.
Figure 5:
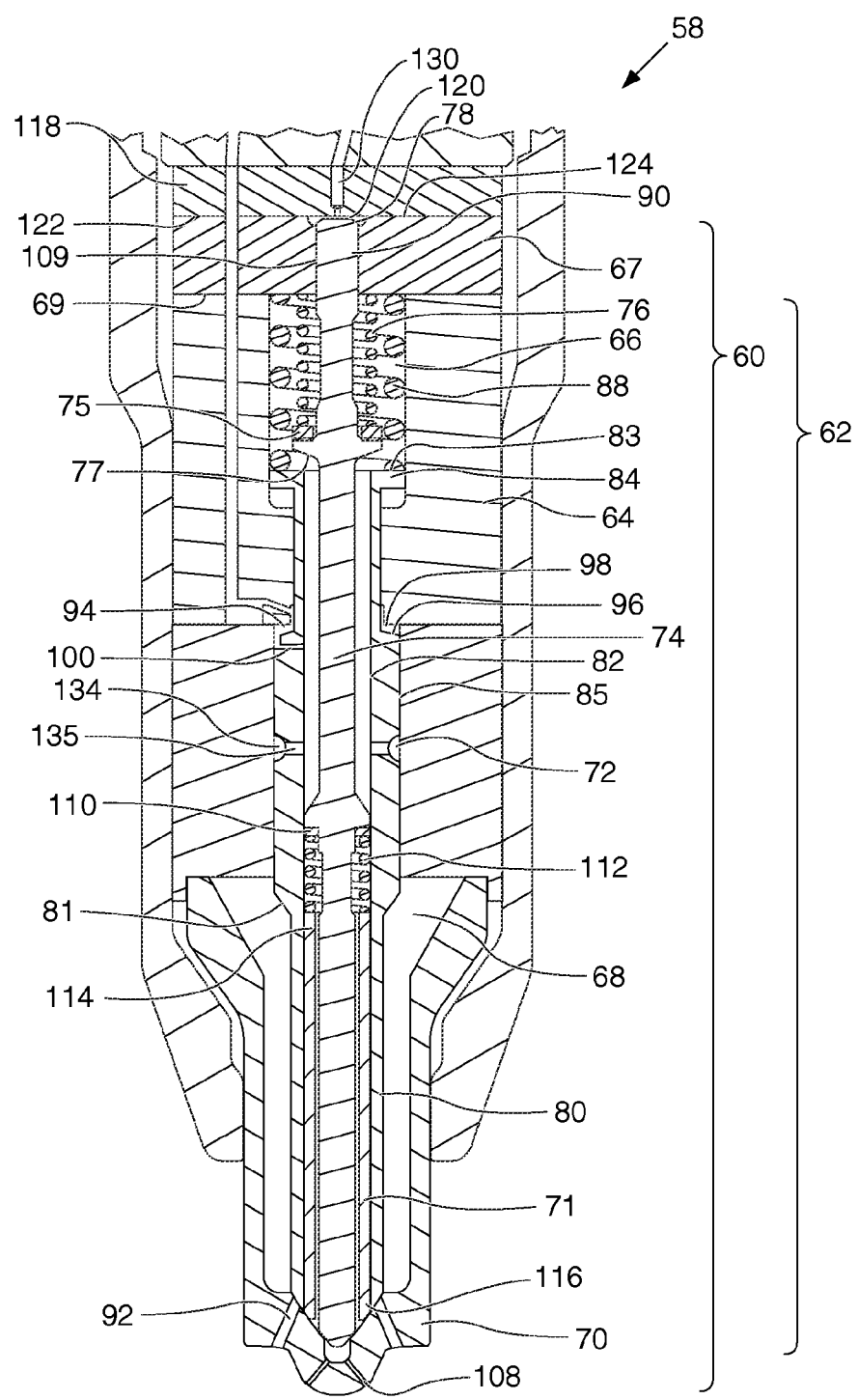
FIG. 5 is a differently oriented detail view of the nozzle group of the dual fuel injector according to the first embodiment.

As shown in greater detail in FIGS. 4 and 5, injector 12 further includes a nozzle assembly 58. The nozzle assembly 58 of this embodiment is commonly referred to as concentric, because of the way the diesel check needle assembly 60 is concentrically positioned within the gaseous check needle assembly 62. The nozzle assembly 58 includes a nozzle body 64 defines a gaseous fuel cavity 68 and partially defines a diesel fuel cavity 66. The nozzle assembly 58 further includes a diesel check needle guide 67. A lower surface 69 of diesel check needle guide 67 partially defines the diesel fuel cavity 66. The diesel fuel cavity 66 is in fluid communication with the diesel fuel supply passage 54. Similarly the gaseous fuel cavity 68 is in fluid communication with the gaseous fuel supply passage 56. The nozzle assembly 58 further includes a nozzle tip 70.

The diesel fuel cavity 66 is positioned within the nozzle body 64 such that it is concentric to the gaseous fuel cavity 68. However, there is minimal commingling of the diesel fuel in the diesel fuel cavity 66 and the gaseous fuel in the gaseous fuel cavity 68. In particular, gaseous check needle assembly 62, fuel separator 71 and hydraulic lock assembly 72 function to keep the gaseous and diesel fuels separated within the injector 12.

Gaseous check needle assembly 62 includes a gaseous check needle 80. Gaseous check needle 80 defines an interior space 82. Gaseous check needle 80 further includes a flange 84. A biasing spring 88 positioned between the lower surface 69 of diesel check needle guide 67 of the diesel fuel cavity 66 and flange 84. Gaseous check needle 80 is movable between a first position, wherein it at least partially blocks fluid communication between gaseous fuel disposed in the gaseous fuel cavity 68 and a gaseous orifice 92 in the nozzle tip 70, and a second position wherein it at least partially unblocks fluid communication between gaseous fuel disposed in the gaseous fuel cavity 68 and a gaseous orifice 92 in the nozzle tip 70. Biasing spring 88 biases gaseous check needle 80 toward its first position. Those skilled in the art will recognize that nozzle tip 70 may include multiple gaseous orifices 92.

Gaseous check needle 80 may further include opening hydraulic surfaces 81 and closing hydraulic surfaces 83. Opening hydraulic surfaces 81 may be exposed to gaseous fuel in the gaseous fuel cavity, and closing hydraulic surfaces 83 may be exposed to diesel fuel in the diesel fuel cavity 66. When desired, gaseous fuel acting on the opening hydraulic surfaces 81 may assist the movement of gaseous check needle 80 from its first position to its second position. Similarly, when desired, diesel fuel acting on closing hydraulic surfaces 83 may assist in moving gaseous check needle 80 from its second position to its first position.

Gaseous check needle 80 may be positioned within nozzle body 64 such that gaseous check needle control chamber 94 is formed. A shoulder 96 and an interior portion 98 of nozzle body 64 may define gaseous check needle control chamber 94. Gaseous check needle control chamber 94 is in fluid communication with diesel fuel supply passage 54 via diesel fuel supply passage 54 via diesel fuel cavity 66 and a gaseous z-orifice 100. Gaseous check needle control chamber 94 is also in selective fluid communication with a drain 102, via a gaseous a-orifice 104 and a gaseous check needle control line 106. As will be discussed in greater detail below, gaseous control valve assembly 32 controls the selective fluid communication between gaseous check needle control chamber 94 and drain 102.

A diesel check needle assembly 60 may include a diesel check needle 74. Diesel check needle 74 may be positioned within the interior space 82 of gaseous check needle 80. An upper portion 90 of the diesel check needle 74 is disposed within a bore 109 defined by the diesel check needle guide 67. Diesel check needle 74 may further include a first flange 75. A biasing spring 76 positioned between the lower surface 69 of diesel check needle guide 67 of the diesel fuel cavity 66 and first flange 75. Diesel check needle 74 is movable between a first position, wherein it at least partially blocks fluid communication between diesel fuel disposed in the diesel fuel cavity 66 and a diesel orifice 108 in the nozzle tip 70, and a second position wherein it at least partially unblocks fluid communication between diesel fuel disposed in the diesel fuel cavity 66 and a diesel orifice 108 in the nozzle tip 70. Biasing spring 76 biases diesel check needle 74 toward its first position. Those skilled in the art will recognize that nozzle tip 70 may include multiple diesel orifices 108.

Diesel check needle 74 may further include opening hydraulic surfaces 77 and closing hydraulic surfaces 78. Opening hydraulic surface 77 may be exposed to diesel fuel in the diesel fuel cavity 66. Closing hydraulic surface 78, which may be referred to as the upper surface of the diesel check needle 74, may be exposed to diesel fuel in the diesel check needle control chamber 120. When desired, diesel fuel acting on the opening hydraulic surfaces 77 may assist the movement of diesel check needle 74 from its first position to its second position. Similarly, when desired, diesel fuel acting on closing hydraulic surface 78 may assist in moving diesel check needle 74 from its second position to its first position.

Diesel check needle 74 may further include a second flange 110. A second biasing spring 112 may be positioned between the second flange 110 and a first end 114 of fuel separator 71. The second biasing spring 112 biases the fuel separator 71 such that a second end 116 is in substantially constant sealing contact with the nozzle tip 70. The second end 116 of fuel separator 71 is positioned on nozzle tip 70 such that commingling of diesel fuel and gaseous fuel is substantially prevented.

Nozzle assembly 58 further includes an orifice plate 118. Orifice plate 118 is positioned atop diesel check needle guide 67 such that a diesel check needle control chamber 120 is defined. Specifically, diesel check needle control chamber 120 is partially defined by a lower surface 122 of the orifice plate 118, an upper surface 124 of diesel check needle guide 67, and an upper surface 78 of diesel check needle 74. Diesel check needle control chamber 120 is in fluid communication with diesel fuel supply passage 54 via a diesel z-orifice 128. Diesel check needle control chamber 120 is also in selective fluid communication with drain 102 via a diesel a-orifice 130 and a diesel check needle control line 132. Both diesel z-orifice 128 and diesel a-orifice 130 may be defined by orifice plate 118. As will be discussed in greater detail infra, diesel control valve assembly 30 controls the selective fluid communication between diesel check needle control chamber 120 and drain 102.

Turning now the various passages that facilitate the movement of both diesel and gaseous fuels throughout the various parts of the injector. Those skilled in the art will readily understand that diesel fuel from dual fuel inlet supply injector travels to the diesel fuel cavity 66 via the diesel fuel supply passage 54. Diesel fuel supply passage 54 is made up of several interconnecting passages found in the injector body 50, orifice plate 118, diesel check needle guide 67, and nozzle body 64. Likewise, gaseous fuel travels from the dual fuel inlet 52 to the gaseous fuel cavity 68 via the gaseous fuel supply passage. Gaseous fuel supply passage 56 is made up of several interconnecting passages found in the injector body 50, orifice plate 118, diesel check needle guide 67 and nozzle body 64.

A hydraulic lock assembly 72 may further be defined within nozzle body 64. The hydraulic lock assembly 72 may include a ring cavity 134 defined by the nozzle body 64. Ring cavity 134 may encompass gaseous check needle 80. Hydraulic lock assembly may further include at least one passage 135 that facilitates fluid communication between the diesel fuel cavity 66 and the ring cavity 134. As the gaseous check needle reciprocates between its first and second positions, gaseous fuel from the gaseous fuel cavity 68 may begin to migrate up the exterior surface 85 of the gaseous check needle 80. In the absence of a hydraulic lock assembly, this migrating gaseous fuel may eventually begin to commingle with the diesel fuel in the diesel fuel cavity. Such commingling is undesired. The hydraulic lock assembly 72 prevents this undesired effect because the diesel fuel within the diesel fuel cavity 66 is at a pressure that is higher than that of the pressure of the gaseous fuel in the gaseous fuel cavity 68. Ideally, this pressure difference is about 5 MPa. Thus, as gaseous fuel seeks to migrate up the exterior surface 85 of the gaseous check needle 80, the higher pressure of the diesel fuel in the hydraulic lock assembly 72 prevents the gaseous fuel from traveling up to the diesel fuel cavity 66.

The diesel control valve assembly 30 and gaseous control valve assembly 32 control the operation of the injector 12. More specifically, the diesel control valve assembly 30 controls the injection of diesel fuel, and the gaseous control valve assembly 32 controls the injection of gaseous fuel. The diesel control valve assembly 30 is at least partially disposed within the injector body 50, and includes a control valve 136 coupled to an armature 138. The control valve 136 may be a two-way valve that moves between a closed position and an open position. Control valve 136 may be normally biased toward the closed position by a biasing spring 140 and piston 142. In the closed position, fluid communication between the diesel check needle control chamber 120 and a drain 102 is blocked. When the control valve 136 is in the open position, fluid communication between the diesel check needle control chamber 120 and the drain 102 is established. More specifically, diesel fuel from the diesel check needle control chamber 120 may travel up the diesel check needle control line 132, across the control valve 136, and out drain 102.

The diesel control valve assembly 30 further includes an electrical actuator 144. Electrical actuator 144 may be a solenoid that, when energized, creates an electromagnetic field that causes armature 138 and the coupled control valve 136 to lift by overcoming the downward forces applied by biasing spring 140 and piston 142. When this occurs, control valve 136 is moved to its open position and fluid communication between the diesel check needle control chamber 120 and the drain 102. When electrical actuator 144 is deenergized, the electromagnetic field dissipates and the downward forces applied by biasing spring 140 and piston 142 cause armature 138 and the coupled control valve 136 to return to their original closed position. In this closed position, fluid communication between the diesel check needle control chamber 120 and the drain 102 is blocked. Those skilled in the art will recognize that the configuration of the diesel control valve assembly 30 may be done in a variety of ways without departing from the scope of the present disclosure. For example, the control valve could be a three way valve, the electrical actuator may be of a piezo type, or multiple biasing springs or pistons could be employed.

Although the gaseous control valve assembly 32 is configured to control the injection of gaseous fuel, it too uses diesel fuel as the control medium. The gaseous control valve assembly 32 may also be at least partially disposed within the injector body 50. The gaseous control valve assembly 32 includes a control valve 146 coupled to an armature 148. The control valve 146 may be a two way valve that moves between a closed position and an open position. Control valve 146 may be normally biased toward the closed position by a biasing spring 150 and piston 152. In the closed position, fluid communication between the gaseous check needle control chamber 94 and the drain 102 is blocked. When control valve 146 is in the open position, fluid communication between gaseous check needle control chamber 94 and the drain 102 is established. More specifically, diesel fuel from the gaseous check needle control chamber 94 may travel up the gaseous check needle control line 106, across the control valve 146, and out drain 102.

The gaseous control valve assembly 32 further includes an electrical actuator 154. Electrical actuator 154 may be a solenoid that, when energized, creates an electromagnetic field that causes armature 148 and the coupled control valve 146 to lift by overcoming the downward forces applied by biasing spring 150 and piston 152. When this occurs, control valve 146 is moved to its open position and fluid communication between the gaseous check needle control chamber 94 and the drain 102 is established. When electrical actuator 154 is deenergized, the electromagnetic field dissipates and the downward forces applied by biasing spring 150 and piston 152 cause armature 148 and the coupled control valve 146 to return to their original closed position. In this closed position, fluid communication between the gaseous check needle control chamber 94 and the drain 102 is blocked. Those skilled in the art will recognize that the configuration of the gaseous control valve assembly 32 may be done in a variety of ways without departing from the scope of the present disclosure. For example, the control valve could be a three way valve, the electrical actuator may be of a piezo type, or multiple biasing springs or pistons could be employed.

The operation of injector 12 will now be explained. For ease of understanding, a diesel fuel injection will first be explained, followed by that of a gaseous injection. The movement of diesel check needle 74 from its first position to its second position is controlled in part by the presence of high pressure diesel fuel in diesel fuel supply passage 54, the diesel fuel cavity 66, diesel check needle control chamber 120, and the diesel check needle control line 132. Biasing spring 76 also plays a role in the movement of diesel check needle 74 from its first position to its second position. When an injection of diesel fuel is not desired, the electrical actuator 144 of the diesel control valve assembly 30 is not energized. Pressurized diesel fuel is delivered to injector 12 via a quill assembly 24. Diesel fuel, which is at a pressure higher than that of gaseous fuel, may be delivered via first quill tube 26. First quill tube 26 may be disposed within a second quill tube 28. Diesel fuel enters the injector 12 via a dual fuel inlet 52. As shown in FIGS. 1-3, dual fuel inlet 52 may be configured to receive diesel fuel from the inner or first quill tube 26 of quill assembly 24. However, those skilled in the art will recognize that the quill assembly 24 and the dual fuel inlet 52 may also both be configured to respectively deliver and receive diesel fuel via the outer or second quill tube 28 of the quill assembly 24. Once pressurized diesel fuel enters the dual fuel inlet 52, it is delivered to the diesel fuel cavity 66 via the diesel fuel supply passage 54. A portion of the diesel fuel from the diesel fuel supply passage 54 travels through the diesel z-orifice 128, diesel check needle control chamber 120, and diesel a-orifice 130 to back fill the diesel check needle control line 132. Because the electrical actuator 144 is deenergized, diesel fuel may not cross the control valve 136. Thus, diesel fuel also quickly back fills the diesel check needle control chamber 120. In this state, there are essentially two forces operating to keep the diesel check needle 74 in its first position. The first force is the downward force applied by biasing spring 76. The second force is the downward force applied by the pressurized diesel fuel in the diesel check needle control chamber 120. This second downward force is applied directly to the upper surface 78 of the diesel check needle 74. As long as the electrical actuator 144 is deenergized, these two forces are greater than the sum of the forces seeking to move the diesel check needle 74 to its second position. Thus, injection of diesel fuel is prevented.

When injection of diesel fuel is desired, the electrical actuator 144 of diesel control valve assembly 30 is energized, thus creating an electromagnetic field. The electromagnetic field attracts armature 138 and the coupled control valve 136. The attracting force of the electromagnetic field is sufficient to overcome the downward force of biasing spring 140, causing the armature 138 and control valve 136 to lift. As control valve 136 moves to its open position, fluid communication between the diesel check needle control chamber 120 and the drain 102 is established. Thus, the pressurized diesel fuel from the diesel check needle control chamber 120 travels through the diesel a-orifice 130, up the diesel check needle control line 132, across control valve 136, and out the drain 102. As this occurs, pressure within the diesel check needle control chamber 120 drops and the downward force caused by the pressure is reduced. Now, the overall downward forces applied to the diesel check needle 74 are less than the upward forces applied by the diesel fuel to the opening hydraulic surfaces 77 applied to diesel check needle assembly. Thus, the diesel check needle 74 lifts and diesel fuel is injected via the at least one diesel orifice 108.

When it is desirable to stop the injection of diesel fuel, electrical actuator 144 is deenergized. As the electromagnetic field generated by electrical actuator 144 dissipates, the force of biasing spring 140 acts on piston 142 pushing control valve 136 downward. Thus, control valve 136 is returned to its closed position, wherein fluid communication between the diesel check needle control chamber 120 and the drain 102 is blocked. When this occurs, diesel fuel is once again allowed to fill the diesel check needle control line 132 and back fill the diesel check needle control chamber 120. Thus, pressure within the diesel check needle control chamber 120 increased. When this occurs, the downward forces applied to the diesel check needle assembly 60 are greater than the upward forces. The diesel check needle 74 returns to its first position, wherein the at least one diesel orifice 108 is blocked, thus ending the diesel injection event.

An injection of gaseous fuel is similar to that of diesel fuel. However, as will be seen, there are some important differences. For example, although gaseous fuel is being injected, diesel fuel plays a large role in the movement of gaseous check needle 80 from its first position to its second position. When an injection of gaseous fuel is not desired, electrical actuator 154 of the gaseous control valve assembly 32 is not energized. Pressurized gaseous fuel is delivered to the injector 12 via the second quill tube 28 of the quill assembly 24. Gaseous fuel enters the dual fuel inlet 52, wherein it is delivered to the gaseous fuel cavity 68 via the gaseous fuel supply passage 56. Diesel fuel, which enters the dual fuel inlet 52, is supplied to the gaseous check needle control line 106 via the diesel fuel supply passage 54, the gaseous z-orifice 100, the gaseous check needle control chamber 94, and the gaseous a-orifice 104. Due to the fact that the electrical actuator 154 is deenergized, biasing spring 150 and piston 152 work to keep control valve 146 in its closed position, thereby preventing diesel fuel from crossing control valve 146. Thus, diesel fuel quickly back fills the gaseous check needle control chamber 94. In this state, there are essentially two forces operating to keep the gaseous check needle 80 in its first position. The first force is the downward force applied by biasing spring 76. The second force is the downward force applied by the pressurized diesel fuel in the gaseous check needle control chamber 94. As long as the electrical actuator 154 is deenergized, these three forces are greater than the sum of the forces seeking to move gaseous check needle 80 to its second position. Thus, injection of gaseous fuel is prevented.

When injection of gaseous fuel is desired, the electrical actuator 154 of gaseous control valve assembly 32 is energized, thus creating an electromagnetic field. The electromagnetic field attracts armature 148 and the coupled control valve 146. The attracting force of the electromagnetic field is sufficient to overcome the downward of biasing spring 150 and piston 152, causing the armature 148 and control valve 146 to lift. As control valve 146 moves to its open position, fluid communication between the gaseous check needle control chamber 94 and the drain 102 is established. Thus, pressurized diesel fuel from the gaseous check needle control chamber 94 travels through the gaseous a-orifice 104, up the gaseous check needle control line 106, across control valve 146, and out drain 102. As this occurs, pressure within the gaseous check needle control chamber 94 drops and the downward force caused by that pressure is reduced. At this point, the overall downward forces applied to the gaseous check needle 80 are less than the upward forces applied by the gaseous fuel to the opening hydraulic surfaces 81 of the gaseous check needle 80. Thus the gaseous check needle 80 lifts and moves to its second position and gaseous fuel is injected via the at least one gaseous orifice 92.

During a diesel injection event, fuel separator 71 minimizes commingling of diesel and gaseous fuels at nozzle tip 70. Specifically, second biasing spring 112, which is positioned between second flange 110 and the first end 114 of fuel separator 71, biases fuel separator 71 downward. Thus, the second end 116 of fuel separator 71 is in substantially constant sealing contact with nozzle tip 70. Even during a diesel injection event, where the diesel check needle 74 is in its second position, second biasing spring 112 still biases fuel separator 71 downward such that diesel fuel in the diesel fuel cavity 66 is prevented from commingling with gaseous fuel in the gaseous fuel cavity 68.

When it is desirable to stop the injection of gaseous fuel, electrical actuator 154 is deenergized. As the electromagnetic field generated by electrical actuator 154 dissipates, the force of biasing spring 150 acts on piston 152 pushing control valve 146 downward. Thus, control valve 146 is returned to its closed position, wherein fluid communication between the gaseous check needle control chamber 94 and the drain 102 is blocked. When this occurs, diesel fuel is once again allowed to fill the gaseous check needle control line 106 and back fill the gaseous check needle control chamber 94. Thus, pressure within the gaseous check needle control chamber 94 is increased. When this occurs, the downward forces applied to the gaseous check needle 80 are greater than the upward forces. The gaseous check needle 80 returns to its first position, wherein the gaseous orifice 92 is blocked; thus ending the gaseous injection event.

As previously mentioned, the injection of gaseous fuel is largely controlled by diesel fuel moving into and out of the gaseous check needle control chamber 94. The selection of diesel fuel as a control medium is largely due to the fact that diesel fuel is much more viscous than gaseous fuels. Thus, diesel fuel acts as an excellent lubricant. This increased lubricity helps protect the sensitive surfaces of the gaseous control valve assembly 32. Those skilled in the art will also recognize that the same lubricity benefits also apply to the diesel control valve assembly 30.

The viscous nature of diesel fuel also has benefits with respect to injector tips. Gaseous fuels may cause excessive tip wear because of their low viscosity and low bulk modulus. This excessive wear can lead to tip failure, and ultimately failure of the injector. To combat this issue in the present injector 12, small amounts of diesel fuel are permitted to leak into the gaseous fuel cavity 68. This is accomplished through the hydraulic lock assembly 72. Diesel fuel pressure within dual fuel common rail fuel system 10 is higher than that of gaseous fuel. Ideally, the pressure difference is approximately 5 MPa. Because of this pressure difference, small amounts of diesel fuel delivered to the ring cavity 134 of the hydraulic lock assembly 72, seep into the gaseous fuel cavity 68. This small amount of diesel fuel lubricates exterior surface 85 of gaseous check needle 80 as it reciprocates between its first and second positions.

INDUSTRIAL APPLICABILITY

The dual fuel common rail fuel system 10 of the present disclosure finds general applicability to any engine that utilizes two fuels in the combustion space of an associated engine. These two fuels may be the same fuel at two different pressures, or may, as in the illustrated embodiment be different fuels. Although the present disclosure could apply to spark ignited engines utilizing appropriate fuels, the present disclosure finds particular applicability in gaseous fuel engines that utilize a relatively large charge of natural gas that is ignited via compression ignition of a small charge of distillate diesel fuel originating from diesel fuel rail 20.

As shown in FIGS. 6a-6f, which generically depict the injection volumes of diesel and gaseous fuel versus time, the disclosed fuel injectors have the capability of injecting diesel and gaseous fuel according to a variety of different shot modes. Preferably, the diesel charge of an injection event is approximately 3-5% of the overall injection charge of diesel and gaseous fuel.

FIG. 6a shows a shot mode wherein the diesel charge 200 begins and ends the beginning of a large uninterrupted gaseous charge 202. Alternatively, as shown in FIG. 6b, the entire diesel charge 204 can come in between an initial gaseous charge 206, and a post gaseous charge 208. FIG. 6c shows a shot mode wherein the diesel charge 210 comes after an initial gaseous charge 212, but simultaneous with the beginning of a second gaseous charge 214. FIG. 6c also shows a third gaseous charge 216. In FIGS. 6d-6f, the diesel injection is split into two smaller and separate charges spaced apart by a period of time. For example, FIG. 6d shows an initial diesel charge 218 followed by the beginning of a single large gaseous charge 220, and wherein the second diesel charge 222 begins after the beginning of the gaseous charge 220, and ends prior to the end of the gaseous charge 220. FIG. 6e shows a shot mode wherein the initial diesel charge 224 and the initial gaseous charge 226 begin simultaneously. However, the initial gaseous charge 226 is longer in duration. The second diesel charge 228 occurs after the end of the initial gaseous charge 226. The second gaseous charge 230 occurs after the end of the second diesel charge 228. FIG. 6f once again shows an initial diesel charge 232 and initial gaseous charge 234 begin simultaneously. Again, the initial gaseous charge 234 is longer in duration than the initial diesel charge 232. A second gaseous charge 236 begins before the beginning of second diesel charge 238, and ends after the end of the second diesel charge 238. FIG. 6f also discloses a tertiary gaseous charge 240. Those skilled in the art will recognize that the shot modes disclosed in FIGS. 6a-6f are merely exemplary, and that the disclosed injector 12 can achieve any myriad of shot modes.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A dual fuel injector comprising:
    an injector body defining a dual fuel inlet configured to receive a first fuel and a second fuel, a first fuel supply passage, a second fuel supply passage, a first fuel control chamber, a second fuel control chamber, a first fuel control line, a second fuel control line, at least one low pressure drain, a first fuel check cavity and a nozzle having at least one first fuel outlet and at least one second fuel outlet;
    a first fuel check needle disposed in the first fuel check cavity and movable between a first position wherein the first fuel check needle blocks fluid communication between the first fuel supply passage and the at least one first fuel outlet, and a second position wherein the first fuel check needle at least partially allows fluid communication between the first fuel supply passage and the at least one first fuel outlet, and wherein the first fuel check needle defines an interior cavity;
    a second fuel check needle positioned within the interior cavity of the first fuel check needle and movable between a first position wherein the second fuel check needle blocks fluid communication between the second fuel supply passage and the at least one second fuel outlet, and a second position wherein the second fuel check needle at least partially allows fluid communication between the second fuel supply passage and the at least one second fuel outlet;
    a hydraulic lock assembly configured to facilitate fluid communication between the first fuel supply passage and gaseous check cavity;
    a first fuel control valve assembly disposed at least partially within the injector body and having a control valve member that selectively allow fluid communication between the first fuel control chamber, the first fuel control line and the at least one low pressure drain; and
    a second fuel control valve assembly disposed at least partially within the injector body and having a control valve member the selectively allows fluid communication between the second fuel control passage and the at least one low pressure drain.

2. The dual fuel injector of claim 1, wherein the dual fuel inlet is further configured to receive high pressure diesel fuel and medium pressure gaseous fuel delivered in a coaxial fashion.

3. The dual fuel injector of claim 2, wherein the second fuel supply passage is in fluid communication with the first fuel control chamber via a first fuel z-orifice, and the second fuel supply passage is in fluid communication the second fuel control chamber via a second fuel z-orifice.

4. The dual fuel injector of claim 3, wherein the first fuel control chamber is in fluid communication with the first fuel control line via a first fuel a-orifice, and the second fuel control chamber is in fluid communication with the second fuel control line via a second fuel a-orifice.

5. The dual fuel injector of claim 4, further including an orifice plate defining the second fuel a-orifice and the second fuel z-orifice.

6. The dual fuel injector of claim 5, wherein both the first fuel a-orifice is formed within the injector body and the first fuel z-orifice is formed within the first fuel check needle.

7. The dual fuel injector of claim 6, further including a first biasing spring configured to bias the first fuel check needle toward its first position, and further includes a second biasing spring configured to bias the second fuel check needle toward its first position.

8. The dual fuel injector of claim 7, wherein the second biasing spring is concentrically nested within the first biasing spring.

9. The dual fuel injector of claim 8, further including a fuel separator disposed in the interior cavity of the first check needle and in sealing contact with the nozzle and configured to prevent commingling of the first fuel and the second fuel.

10. The dual fuel injector of claim 9, further including a third biasing spring configured to bias the fuel separator toward its sealing contact.

11. The dual fuel injector of claim 10, wherein the hydraulic lock assembly is formed within the first check needle.

12. The dual fuel injector of claim 11, wherein the second fuel is at a pressure approximately 5 MPa higher than the first fuel.

13. The dual fuel injector of claim 12, wherein the first fuel is a gaseous fuel and the second fuel is a diesel fuel.

14. A dual fuel common rail fuel system comprising:
    a first fuel source;
    a second fuel source;
    a first fuel rail;
    a second fuel rail;
    at least one first fuel pump configured pressurize the first fuel from the first fuel source and deliver the first fuel to the first fuel rail;
    at least one second fuel pump configured to pressurize the second fuel from the second fuel source and deliver the second fuel to the second fuel rail;
    a quill configured to the first fuel from the first fuel rail and second fuel from the second fuel rail;
    a dual fuel injector configured to receive both the first fuel and the second fuel from the quill, and further comprising:
        an injector body defining a dual fuel inlet configured to receive a first fuel and a second fuel, a first fuel supply passage, a second fuel supply passage, a first fuel control chamber, a second fuel control chamber, a first fuel control line, a second fuel control line, at least one low pressure drain, a first fuel check cavity and a nozzle having at least one first fuel outlet and at least one second fuel outlet;
        a first fuel check needle disposed in the first fuel check cavity and movable between a first position wherein the first fuel check needle blocks fluid communication between the first fuel supply passage and the at least one first fuel outlet, and a second position wherein the first fuel check needle at least partially allows fluid communication between the first fuel supply passage and the at least one first fuel outlet, and wherein the first fuel check needle defines an interior cavity;

a second fuel check needle positioned within the interior cavity of the first fuel check needle and movable between a first position wherein the second fuel check needle blocks fluid communication between the second fuel supply passage and the at least one second fuel outlet, and a second position wherein the second fuel check needle at least partially allows fluid communication between the second fuel supply passage and the at least one second fuel outlet;

a hydraulic lock assembly configured to facilitate fluid communication between the first fuel supply passage and gaseous check cavity;

a first fuel control valve assembly disposed at least partially within the injector body and having a control valve member that selectively allow fluid communication between the first fuel control chamber, the first fuel control line and the at least one low pressure drain; and a second fuel control valve assembly disposed at least partially within the injector body and having a control valve member the selectively allows fluid communication between the second fuel control passage and the at least one low pressure drain.

15. The dual fuel common rail fuel system of claim 14, wherein the second fuel supply passage is in fluid communication with the first fuel control chamber via a first fuel z-orifice, and the second fuel supply passage is in fluid communication the second fuel control chamber via a second fuel z-orifice.

16. The dual fuel common rail fuel system of claim 15, wherein the first fuel control chamber is in fluid communication with the first fuel control line via a first fuel a-orifice, and the second fuel control chamber is in fluid communication with the second fuel control line via a second fuel a-orifice.

17. The dual fuel common rail fuel system of claim 16, further including a fuel separator disposed in the interior cavity of the first check needle and in sealing contact with the nozzle and configured to prevent commingling of the first fuel and the second fuel.

18. The dual fuel common rail fuel system of claim 17, wherein the hydraulic lock assembly is formed within the first check needle.

19. The dual fuel injector of claim 18, wherein the second fuel is at a pressure approximately 5 MPa higher than the first fuel.

20. The dual fuel injector of claim 19, wherein the first fuel is a gaseous fuel and the second fuel is a diesel fuel.

* * * * *